United States Patent
Huf et al.

(10) Patent No.: US 11,052,796 B2
(45) Date of Patent: Jul. 6, 2021

(54) VEHICLE SEAT

(71) Applicant: Bayerische Motoren Werke Aktiengesellschaft, Munich (DE)

(72) Inventors: Andreas Huf, Neusaess (DE); Sylvia Kleindl, Munich (DE); Fabian Koehler, Valley (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/559,754

(22) Filed: Sep. 4, 2019

(65) Prior Publication Data

US 2019/0389341 A1 Dec. 26, 2019

Related U.S. Application Data

(63) Continuation of application No. PCT/EP2018/061399, filed on May 3, 2018.

(30) Foreign Application Priority Data

May 4, 2017 (DE) ..................... 10 2017 207 501.5

(51) Int. Cl.
*B60N 2/427* (2006.01)

(52) U.S. Cl.
CPC ..... *B60N 2/42736* (2013.01); *B60N 2/42772* (2013.01)

(58) Field of Classification Search
CPC ................ B60N 2/42736; B60N 2/42772
See application file for complete search history.

(56) References Cited

U.S. PATENT DOCUMENTS

| | | | | |
|---|---|---|---|---|
| 3,986,748 | A | * 10/1976 | Magnuson | B60N 2/501 296/65.02 |
| 4,257,626 | A | * 3/1981 | Adomeit | B60N 2/4221 280/805 |
| 4,412,595 | A | * 11/1983 | Kinzel | B62K 5/027 180/211 |

(Continued)

FOREIGN PATENT DOCUMENTS

| CN | 105667353 A | 6/2016 |
|---|---|---|
| CN | 106573553 A | 4/2017 |

(Continued)

OTHER PUBLICATIONS

International Search Report (PCT/ISA/210) issued in PCT Application No. PCT/EP2018/061399 dated Jul. 10, 2018 with English translation (four (4) pages).

(Continued)

*Primary Examiner* — Philip F Gabler
(74) *Attorney, Agent, or Firm* — Crowell & Moring LLP

(57) ABSTRACT

A vehicle seat for attaching to a vehicle structure of a vehicle has a seat part and a backrest. The vehicle seat is movable in the longitudinal direction of the vehicle in relation to the vehicle structure and adjustable into a resting or lying seat position. In the event of a collision, the vehicle seat with the seat part is or can be pivoted upwards along an axis extending parallel to the vehicle transverse direction, with a front region facing away from the back rest. The backrest, at least in the resting or lying position, is or can be connected to the vehicle structure of a tensile force transmission element.

17 Claims, 2 Drawing Sheets

(56) References Cited

U.S. PATENT DOCUMENTS

| | | | |
|---|---|---|---|
| 4,738,485 A * | 4/1988 | Rumpf | B60N 2/4221 |
| | | | 280/806 |
| 5,244,252 A | 9/1993 | Serber | |
| 6,109,689 A * | 8/2000 | Nanni | B60N 2/2821 |
| | | | 248/638 |
| 6,367,859 B1 | 4/2002 | Flory et al. | |
| 7,219,958 B2 * | 5/2007 | Yamazaki | B60N 2/2806 |
| | | | 297/256.13 |
| 7,441,838 B2 * | 10/2008 | Patwardhan | B60N 2/888 |
| | | | 297/216.13 |
| 8,317,262 B2 * | 11/2012 | Schroth | B60N 2/005 |
| | | | 297/216.1 |
| 9,896,006 B2 * | 2/2018 | Duncan | B60R 22/26 |
| 10,556,533 B2 * | 2/2020 | Nageshkar | B60N 2/2245 |
| 2013/0152775 A1 * | 6/2013 | Jessup | B60N 2/24 |
| | | | 89/36.08 |
| 2016/0159253 A1 | 6/2016 | Frasher | |
| 2017/0080831 A1 | 3/2017 | Kaemmerer et al. | |

FOREIGN PATENT DOCUMENTS

| | | |
|---|---|---|
| DE | 199 49 728 B4 | 9/2004 |
| DE | 10 2004 049 961 A1 | 4/2006 |
| DE | 10 2008 003 720 A1 | 7/2009 |
| DE | 10 2011 112 259 A1 | 3/2013 |
| DE | 10 2013 007 710 A1 | 11/2014 |
| EP | 0 264 016 A2 | 4/1988 |
| WO | WO 01/12464 A1 | 2/2001 |

OTHER PUBLICATIONS

German-language Written Opinion (PCT/ISA/237) issued in PCT Application No. PCT/EP2018/061399 dated Jul. 10, 2018 (four (4) pages).

German-language Search Report issued in counterpart German Application No. 102017207501.5 dated Jan. 25, 2018 with partial English translation (12 pages).

English translation of Chinese-language Office Action issued in Chinese Application No. 201880012975.2 dated Apr. 6, 2021 (six (6) pages).

\* cited by examiner

VEHICLE SEAT

CROSS REFERENCE TO RELATED APPLICATIONS

This application is a continuation of PCT International Application No. PCT/EP2018/061399, filed May 3, 2018, which claims priority under 35 U.S.C. § 119 from German Patent Application No. 10 2017 207 501.5, filed May 4, 2017, the entire disclosures of which are herein expressly incorporated by reference.

BACKGROUND AND SUMMARY OF THE INVENTION

The present invention relates to a vehicle seat and to a vehicle with such a vehicle seat.

Many vehicle seats in addition to longitudinal adjustability and adjustability of the inclination of the backrest are also provided with an adjustment option which brings at least the backrest of the seat into a lying seat position. Vehicle seats are also known, for example for the vehicle rear of a top range sedan, in which the backrest and the seat part of the seat can be brought into a resting seat position or sleeping position. All these seats share the risk, if a person sitting on the seat takes up a resting seat position or lying seat position during the journey, that, in the event of a head-on collision of the vehicle with an obstacle, the body will submarine under the seat belt and slip down from the seat forward in the direction of travel.

In addition, there is additionally the risk that the hip belt will slip beyond the pelvic bone into the region of the stomach. It therefore needs to be avoided that vehicle passengers who take up a resting or sleeping position on their vehicle seat during the journey will, in the event of an accident, submarine under the seat belt being worn.

In addition to the submarining under the hip belt, there is the risk, when the occupant is being restrained from a lying position in the direction of the posterior, that the internal organs cannot be supported on the chest and therefore, if there is no supporting action, shift in the direction of the abdomen.

It is known from DE 10 2008 003 720 A1, in the event of a head-on accident, to pivot the seat part and the backrest of a vehicle seat about an axis running transversely with respect to the direction of travel. During said pivoting, the seat part forms an abutment for the vehicle passenger, which is intended to prevent the vehicle passenger when lying down from being able to slip through under the seat belt.

WO 2001/12464 discloses a vehicle seat which is mounted by means of a console having rollers on a rail which is connected to the vehicle body, is curved forward and upward and has a curvature about a transverse axis of the vehicle. In the event of a collision, the seat console moves along the curved rail, as a result of which the seat is rotated about a transverse axis of the vehicle with the backrest rearward and the front region of the seat part upward.

DE 10 2011 112 259 A1 shows and describes a vehicle seat, the seat part of which is provided in the front region with a thigh support which is pivotable about a transverse axis of the vehicle and, in the event of a collision, pivots upward with the aid of a Bowden cable mechanism and moves the thighs of a vehicle occupant sitting on the seat upward in the vicinity of the hollow of the knee.

DE 10 2013 007 710 A1 shows a functionally similar embodiment of a vehicle seat in which an airbag is provided in the seat part in the region of the thigh support, the airbag triggering in the event of a collision and thereby catapulting the thighs upward in the region of the hollows of the knee.

DE 10 2004 049 961 A1 shows and describes a vehicle seat which is connected to the bodywork by means of front and rear deformation elements arranged vertically between the seat and the vehicle bodywork in a z direction parallel to the vertical axis of the vehicle. In the event of a head-on impact, the front deformation elements are compressed in the z direction and the rear deformation means are stretched in the z direction, as a result of which the seat executes a rotational movement about a transverse axis during which the seat front edge moves downward. In the event of a rear impact, the rear deformation elements are compressed in the z direction and the front deformation elements are stretched in the z direction, as a result of which the seat executes an opposed rotational movement about a transverse axis, during which the seat front edge moves upward. In addition, the vertically arranged deformation elements can also be deformed laterally forward in the seat direction in order, in the event of a collision, to relieve the load on the structural elements of the seat.

Although, in these known solutions, the body is possibly prevented from slipping through under the seat belt, the body in the event of a head-on collision nevertheless experiences the braking acceleration in its Z direction, wherein, without an effective supporting option, the chest and abdominal organs shift abruptly in the direction of the pelvis.

It is the object of the present invention to design a vehicle seat of the type in question in such a manner that, in the event of a head-on accident, a person in a resting or lying position on the vehicle seat will not slip through under the seat belt being worn.

This and other objects are achieved by a vehicle seat for attaching to a vehicle structure of a vehicle, with a seat part and a backrest, wherein the vehicle seat is displaceable relative to the vehicle structure in the longitudinal direction of the vehicle and is adjustable into a resting or lying seat position, and wherein, in the event of a collision, the vehicle seat with the seat part is pivoted upward, or can be pivoted upward, about an axis running parallel to the transverse direction of the vehicle, with a front region facing away from the backrest. In this vehicle seat, according to the invention, at least in the resting or lying position, the backrest is connected, or can be connected, to the vehicle structure by a tensile force transmission element.

This coupling of the backrest to the vehicle structure makes it possible, in the event of a head-on collision in which the inertia of the longitudinally displaceable seat element causes the latter to move further in the direction of travel in relation to the vehicle structure, for the vehicle seat to pivot about a transverse axis of the vehicle in such a manner that, with the angle between the seat element and backrest substantially remaining constant, that edge of the seat element which is at the front in the direction of travel moves upward, with the seat surface of the seat element being positioned more steeply upward. This not only prevents the risk of a passenger sitting on the seat submarining under the seat belt, but also provides an abutment for the body of said person, against which the posterior of the person can be effectively supported.

It is of particular advantage if the tensile force transmission element is attached, or can be attached, in the upper half, preferably in the upper third, furthermore preferably in the upper quarter, of the backrest. This embodiment can be used particularly readily if the vehicle seat is provided as a seat for the rear seat row of a sedan or of a vehicle equipped with just one seat row. In this embodiment, that part of the backrest which is positioned below the location at which the tensile force transmission element is attached to the backrest forms a large lever arm as far as the pivot axis about which the vehicle seat is pivoted in the event of a head-on collision.

An energy absorption device which is advantageously formed by a tensile force limiting device is preferably provided in the connection between the vehicle structure and the backrest, said connection having the tensile force transmission element. The energy absorption device limits the retaining force with which the backrest is secured on the vehicle structure. As a result, the braking acceleration which acts on the person sitting on the vehicle seat is limited and the collision-induced impulse is damped.

It is of advantage if the tensile force transmission element has the energy absorption device.

It is furthermore advantageous if the energy absorption device has at least one deformation element which is deformed in particular by elongation.

It is particularly advantageous if a seat console is provided with which the vehicle seat can be attached to the vehicle structure directly or by way of a longitudinal adjustment device having a longitudinally displaceable slide.

The invention is furthermore directed toward a vehicle, in particular a motor vehicle, with at least one vehicle seat according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
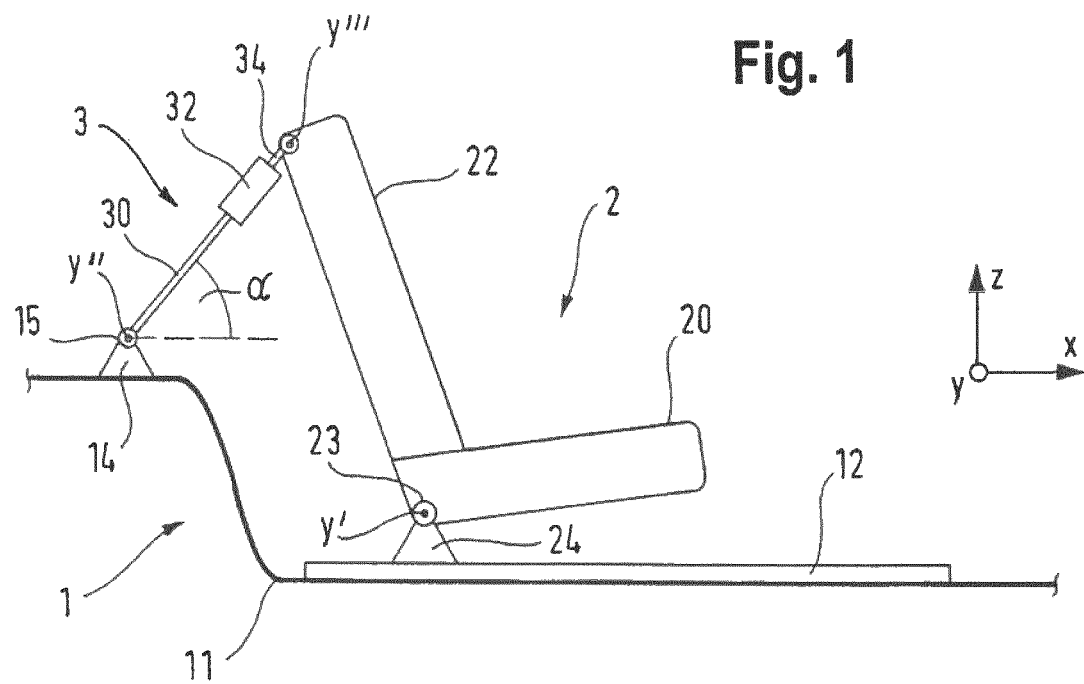
FIG. 1 shows a vehicle seat according to an embodiment of the invention in the upright normal position.

FIG. 1 shows a vehicle seat 2 which is mounted displaceably on a schematically illustrated vehicle structure 11 of a vehicle 1. The vehicle seat has a lower seat part 20 and a backrest 22 which are arranged at a preferably adjustable angle with respect to each other. The vehicle seat 2 is provided in the rear region of the seat part 20 with a console 24 which is mounted displaceably in the longitudinal direction x of the vehicle in at least one rail 12 running in the longitudinal direction x of the vehicle and attached to the vehicle structure 11. The vehicle seat 2 is mounted via a pivot joint 23 on the console 24 so as to be pivotable about an axis y' running parallel to the transverse direction y of the vehicle. The pivotability about said axis y' is independent of the setting of the angle between the seat part 20 and the backrest 22.

A tensile force transmission element 3 is attached to the upper edge of the backrest 22 and, at its other end, is mounted on a bearing block 14, which is fixedly connected to the vehicle structure 11, in a pivot joint 15 there so as to be pivotable about a pivot axis y''' running parallel to the transverse direction y of the vehicle.

The tensile force transmission element 3 comprises a tension rod 30 which, at its one end, is mounted in an articulated manner on the pivot bearing 15 and which, at its other end, is connected to an energy absorption device 32. The energy absorption device 32 is mounted on the backrest 22 directly or via a further tension rod 34 so as to be pivotable about a pivot axis y''' likewise running parallel to the transverse direction y of the vehicle. Instead of the tension rods 30, 34, tensionproof cables can also be provided.

The energy absorption device 32 is designed, for example, as a tension force limiting device in such a manner that, when a predetermined or predeterminable tensile force is exceeded, the energy absorption device 32 stretches in its longitudinal extent and thereby prevents an increase in the tensile force at least until a predetermined extension length is reached.

Figure 2:
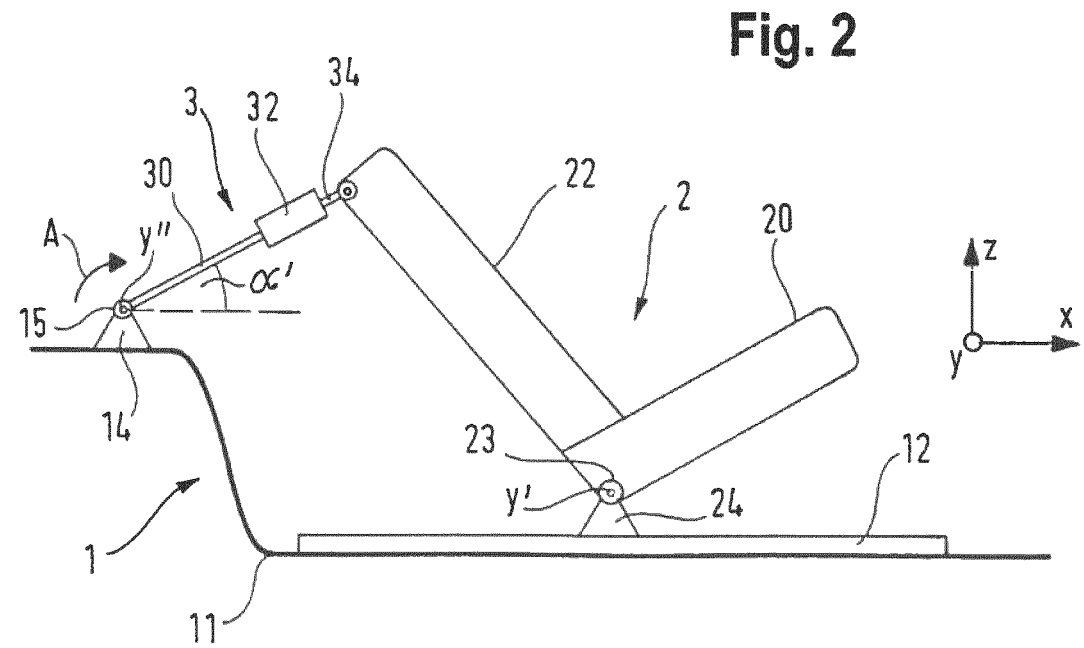
FIG. 2 shows the vehicle seat from FIG. 1 in a resting or lying seat position.

FIG. 2 shows the vehicle seat in a resting or lying seat position in which the console 24 of the vehicle seat 2 has been displaced forward in the longitudinal direction x of the vehicle along the at least one rail 12 in relation to the upright seat position illustrated in FIG. 1. The length of the tensile force transmission element 3 has remained constant here, and therefore the tensile force transmission element 3 holds back the upper edge of the seat back 22, and, in the process, the tensile force transmission element 3 pivots about the pivot axis y'' of the vehicle-mounted pivot bearing 15, in the clockwise direction in the illustration shown, as symbolized by the arrow A. The angle α' which is formed between the tension rod 30 of the tensile force transmission element 3 and a horizontal running through the pivot axis y'' is smaller than the corresponding angle α in the upright seat position shown in FIG. 1. However, in the resting or lying seat position shown in FIG. 2, the angle α' is greater than zero, and therefore the tensile force transmission element 3 is not extended horizontally.

Figure 3:
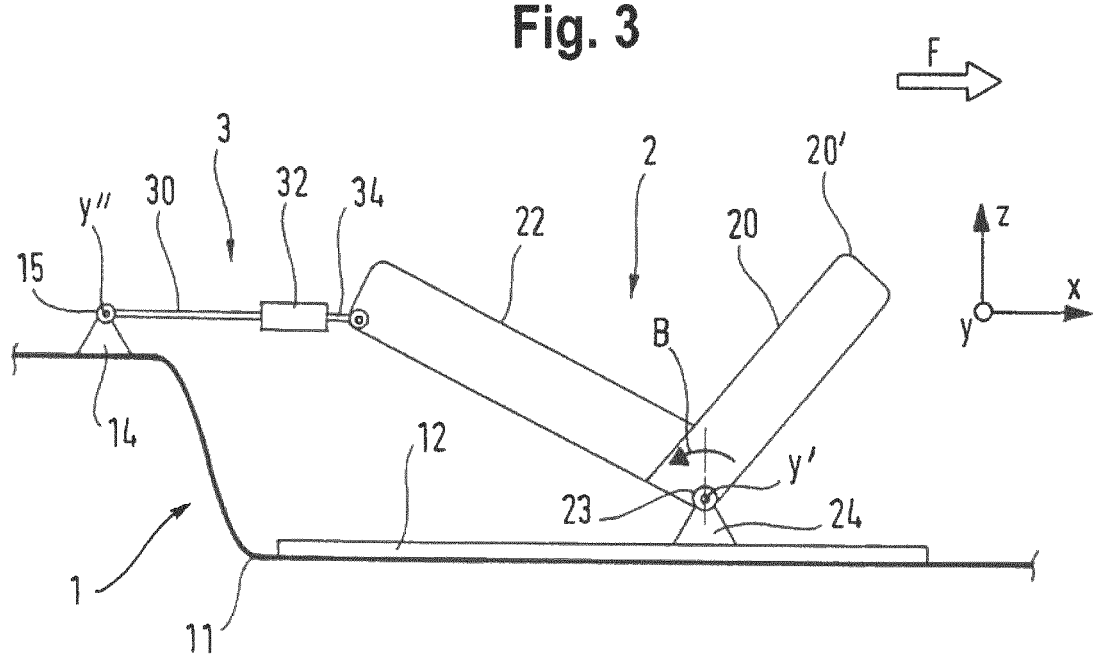
FIG. 3 shows the vehicle seat from FIG. 2 in a position at the beginning of a head-on collision.

FIG. 3 illustrates a position of the vehicle seat 2 which occurs at the beginning of a head-on collision. While the vehicle structure 11 is abruptly braked by the head-on collision, the mass inertia of the vehicle seat 2 and the mass inertia of the person sitting on the vehicle seat 2 cause the vehicle seat 2 to be moved with its console 24 further forward in the longitudinal direction x of the vehicle in the at least one vehicle-mounted rail 12. In order to permit said forward movement, the console 24 is released from its locking with respect to the at least one rail 12 by way of the vehicle impact. The inertia-induced forward movement of the vehicle seat 2 leads to a further pivoting of the tensile force transmission element 3 in the clockwise direction about the pivot axis y'' in relation to the position of FIG. 2 until the tensile force transmission element 3 extends horizontally between the pivot bearing 15 and the upper edge of the backrest 22. The vehicle seat is pivoted even further out of the resting or lying seat position illustrated in FIG. 2 counterclockwise about the pivot axis y' in the pivot bearing 23, as symbolized by the arrow B in FIG. 3. By means of said pivoting movement of the seat 2, the seat part 20 is pivoted further upward by its front region 20', and therefore the seat part 20 forms an abutment for the person on the seat 2 whose mass inertia endeavors to move said person in the direction of travel F, i.e. forward in the direction of the longitudinal axis x of the vehicle.

Figure 4:
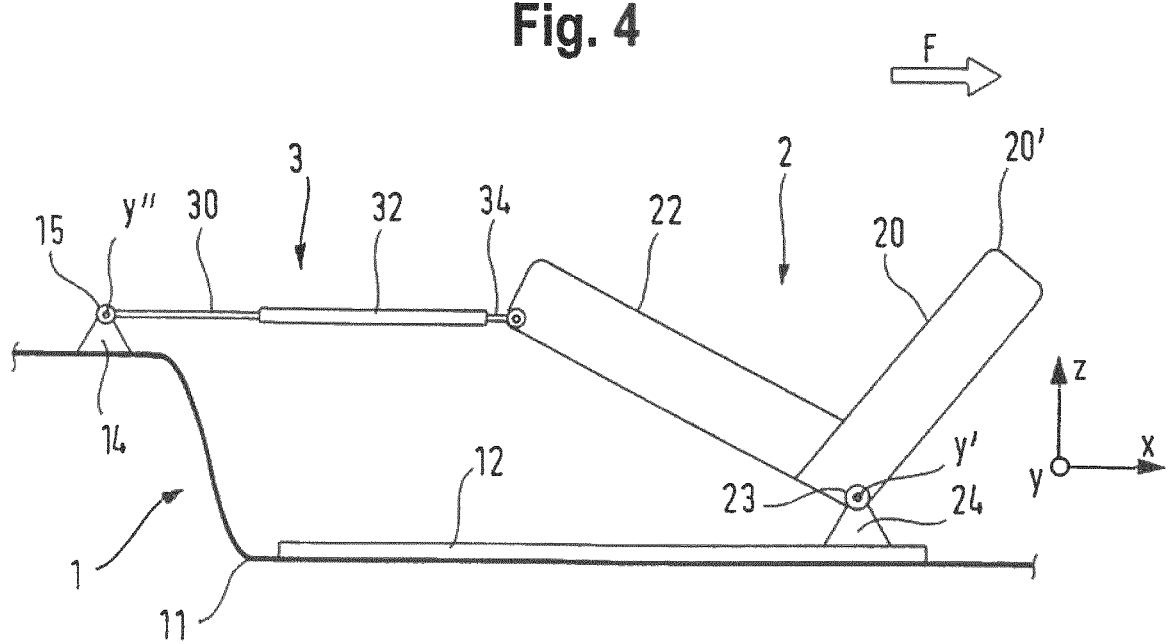
FIG. 4 shows the seat from FIG. 3 during a head-on collision with the energy absorption device activated.

If a maximum tensile force predetermined by the configuration of the energy absorption device 32 is exceeded, the energy absorption device 32 stretches, as illustrated in FIG. 4. As a result, the seat 2 migrates even further forward, with the seat console 24 continuing to be guided in the at least one vehicle-mounted rail 12.

The stretching of the energy absorption device 32 can be linear or nonlinear, as a result of which, for example, the further forward movement of the vehicle seat 2 in the direction of travel F can be braked. This braking action can be set in such a manner that a predetermined acceleration of the vehicle seat 2 and therefore of the person on the vehicle seat 2 in the direction of travel F is limited. During said braked further forward movement of the vehicle seat 2, the inclination of the seat back 22 and of the seat part 20 does not change in relation to the position shown in FIG. 3, and therefore the abutment function of the seat part 20 is maintained.

The invention is not limited to the above exemplary embodiment, which serves merely for the general explanation of the core concept of the invention. Rather, within the scope of protection, the device according to the invention can also adopt other design forms than those described above.

Reference signs in the description and the drawings merely serve for better understanding of the invention and are not intended to restrict the scope of protection.

LIST OF REFERENCE SIGNS

1 Vehicle
2 Vehicle seat
3 Tensile force transmission element
11 Vehicle structure
12 Rail
14 Bearing block
15 Pivot joint
20 Seat part
20' Front region of 20
22 Backrest
23 Pivot joint
24 Console
30 Tension rod
32 Energy absorption device
34 Tension rod
x Longitudinal direction of the vehicle
y Transverse direction of the vehicle
y' Pivot axis
y" Pivot axis
y'" Pivot axis The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle seat for attaching to a vehicle structure of a vehicle, comprising:
a seat part;
a backrest and
a tensile force transmission element,
wherein
the vehicle seat is displaceable relative to the vehicle structure in a longitudinal direction of the vehicle and is adjustable into a resting or lying seat position,
in an event of a collision, the entire vehicle seat is pivotable about an axis running parallel to a transverse direction of the vehicle as the vehicle seat is moving in the longitudinal direction, with a front region of the seat part facing away from the backrest moving upward, and
the tensile force transmission element is connectable between the backrest in a region of the backrest below a headrest and the vehicle structure located longitudinally behind the backrest when the vehicle seat is at least in the resting or lying position.

2. The vehicle seat according to claim 1, wherein
the tensile force transmission element is attachable to the backrest in an upper half thereof.

3. The vehicle seat according to claim 1, wherein
the tensile force transmission element is attachable to the backrest in an upper third thereof.

4. The vehicle seat according to claim 1, wherein
the tensile force transmission element is attachable to the backrest in an upper quarter thereof.

5. The vehicle according to claim 1, wherein
an energy absorption device is provided in the connection between the vehicle structure and the backrest, said connection having the tensile force transmission element.

6. The vehicle according to claim 5, wherein
the tensile force transmission element has the energy absorption device.

7. The vehicle seat according to claim 5, wherein
the energy absorption device has at least one deformation element.

8. The vehicle seat according to claim 5, wherein
the energy absorption device is a tensile force limiting device.

9. The vehicle seat according to claim 1, further comprising:
a seat console with which the vehicle seat is attachable to the vehicle structure directly or via a longitudinal adjustment device having a longitudinally displaceable slide.

10. A vehicle comprising at least one vehicle seat according to claim 1.

11. The vehicle according to claim 10, wherein the vehicle is a motor vehicle.

12. The vehicle seat according to claim 1, wherein
the tensile force transmission element comprises a tension rod or a tension proof cable.

13. The vehicle seat according to claim 1, wherein
one end of the tensile force transmission element is attached to the vehicle structure at a vertical location below that of another end which attaches to an upper half of the backrest when the vehicle seat is in the resting or lying seat position.

14. The vehicle seat according to claim 1, wherein
in an event of a head-on collision, the tensile force transmission element is configured to pivot in a clockwise direction about a transverse axis of the vehicle until extending horizontally, wherein the vehicle seat is pivoted out of the resting or lying position counterclockwise.

15. The vehicle seat according to claim 14, wherein
upon extending horizontally, an energy absorption device of the tensile force transmission element stretches upon exceeding a defined maximum tensile force, wherein the vehicle seat displaces in a forward longitudinal direction of the vehicle.

16. The vehicle seat according to claim 15, wherein
the stretching of the energy absorption device is configured to be linear.

17. The vehicle seat according to claim 15, wherein the stretching of the energy absorption device is configured to be non-linear.

\* \* \* \* \*